US007017721B1

(12) United States Patent  
Bradford et al.

(10) Patent No.: US 7,017,721 B1
(45) Date of Patent: Mar. 28, 2006

(54) CABLE WINDING DEVICE WITH CLOCKED KEYCAP AND REVOLVING ELECTRICAL SWITCH

(75) Inventors: Eric R. Bradford, Campbell, CA (US); Barry Lee, Santa Cruz, CA (US); Timothy P. Johnston, Los Gatos, CA (US); Jacob T. Meyberg, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 17 days.

(21) Appl. No.: 10/952,660

(22) Filed: Sep. 29, 2004

(51) Int. Cl.
*H02G 11/00* (2006.01)

(52) U.S. Cl. .................. 191/12.4; 242/385; 242/390; 345/163; 455/568

(58) Field of Classification Search ............. 242/385, 242/378.1, 285.4, 390, 390.8, 390.9, 396, 242/396.4, 396.5, 396.6; 191/12.2 R, 12.4, 191/12 R; 345/163; 455/568, 569
See application file for complete search history.

(56) References Cited

U.S. PATENT DOCUMENTS 6,082,656 A * 7/2000 Thornton ................. 242/385.4
6,378,797 B1 * 4/2002 Liao ....................... 242/378.1
6,616,080 B1 * 9/2003 Edwards et al. ......... 242/378.1
2002/0023814 A1 * 2/2002 Poutiatine .............. 191/12.2 R

* cited by examiner

*Primary Examiner*—Frantz F. Jules
(74) *Attorney, Agent, or Firm*—Jung-hua Kuo

(57) ABSTRACT

Mechanisms for providing electrical controls on a rotating assembly such as a cable winding device are disclosed. The cable winding device generally includes an electronic control actuator such as a keycap attached to a housing and providing an actuating pad actuatable via an opening provided in the housing, the housing containing a spool, a circuit component including an electronic control such as a switch actuatable via the actuating pad, and a rotational actuator interface such as a skid pad located over the electronic control to interface between the actuator pad and the electronic control at all rotational orientations of the switch relative to the actuating pad and/or even while the spool is rotating. The circuit component and the skid pad are configured to rotate with the spool relative to the housing. The switch is disposed off of an axis of rotation and may be, for example, an answer/end, on/off, mute, volume, play/stop, rewind/fast forward, and/or enter/accept control. The cable winding apparatus may be incorporated in a headset system.

20 Claims, 5 Drawing Sheets

CABLE WINDING DEVICE WITH CLOCKED KEYCAP AND REVOLVING ELECTRICAL SWITCH

BACKGROUND OF THE INVENTION

1. Field of the Invention

The present invention relates generally to rotating assemblies such as cable winding devices. More specifically, mechanisms for providing electrical controls on a rotating assembly such as a cable winding device are disclosed.

2. Description of Related Art

Cable or cord winding devices have been proposed and commercialized for winding various cables such as telephone cables, power cords, and the like. Cable winding devices are often provided for convenience, safety, ease of use, and/or to prevent entanglement of the cable itself and/or with other cables or objects. Cables are typically wound onto one or more take-up reels or spools of the cable winding device.

In certain applications such as telephone applications, it may be desirable to provide electronic controls directly on the cable winding device. A printed circuit board assembly (PCBA) containing the electronics and/or electronic controls may be provided within the cable winding device. However, conventional cord winding devices generally do not provide any electrical controls directly on the cord winding devices.

Thus, it would be desirable to provide a cable winding mechanism with a cost effective, reliable and durable mechanism for providing electrical controls directly on the cable winding device. Ideally, the button, switch or the like serving as the user interface for the electronic control is intuitive and easy to use.

SUMMARY OF THE INVENTION

Mechanisms for providing electrical controls on a rotating assembly such as a cable winding device are disclosed. It should be appreciated that the present invention can be implemented in numerous ways, including as a process, an apparatus, a system, a device, or a method. Several inventive embodiments of the present invention are described below.

The cable winding apparatus generally including an electronic control actuator such as a keycap mounted to a housing and providing an actuating pad actuatable via an opening provided in the housing such as by extending at least partially through the housing opening, the housing further containing a spool, a circuit component including an electronic control (such as a momentary tact switch) actuatable via the actuating pad, and a rotational actuator interface such as a skid pad suspended over the electronic control to interface between the actuator pad and the electronic control. The circuit component and the skid pad are configured to rotate with the spool relative to the housing. The switch is disposed off of the spool's axis of rotation and may be, for example, an answer/end, on/off, mute, volume, play/stop, rewind/fast forward, and/or enter/accept control.

The skid pad may be coupled to the circuit component at one end and cantilevered over the switch at the opposing end. By depressing the actuating pad on the keycap, the skid pad is forced down to actuate the switch. The skid pad also facilitates the actuating pad in actuating the switch at all rotational orientations of the switch relative to the actuating pad and/or even while the spool is rotating. The keycap may provide raised contact member(s) on a surface opposite that of the actuating pad to facilitate contact between the elongated member and the skid pad when the actuating pad is depressed.

The cable winding apparatus may further include a ratchet pawl mechanism that includes a ratchet that rotates with the spool and a ratchet pawl provided on an interior of the housing to engage the ratchet. The ratchet pawl mechanism can be configured with only one ratchet stop for each complete revolution of the spool. The actuating pad on the keycap and the switch are preferably configured to be axially aligned when the ratchet and the ratchet pawl are engaged.

The cable winding device may be incorporated in a headset system in which a headset includes a speaker and/or a microphone. One end of the cable may be coupled to the headset while the other end of the cable may be coupled to a base unit such as a telephone.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Mechanisms for providing electrical controls on a rotating assembly such as a cable winding device are disclosed. The examples of cable winding devices described herein may be utilized in audio headset applications such as telephone headsets, audio listening headsets, and other personal listening devices. However, it is to be understood that the cable winding devices and mechanisms described herein may be similarly applied to various other applications such as power cords for household appliances, cables associated with peripherals (e.g., keyboard, mouse, speaker, etc.) for electronic devices such as computer, personal digital assistant (PDA), cellular telephones, sound recording device, and the like. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In certain applications such as in telephone and/or other audio listening headset applications, it may be desirable to provide electronics and/or electronic controls directly on a cable winding device. Examples of electronic controls include call answer/end, on/off control, mute control, volume control, play/stop, rewind/fast forward, enter/accept control, etc. The provision of such electronic controls directly on the cable winding device allows easy and convenient access to those controls by the user and thus may improve the ease of use of the apparatus for which the cable winding device supports, such as a headset.

Figure 1:
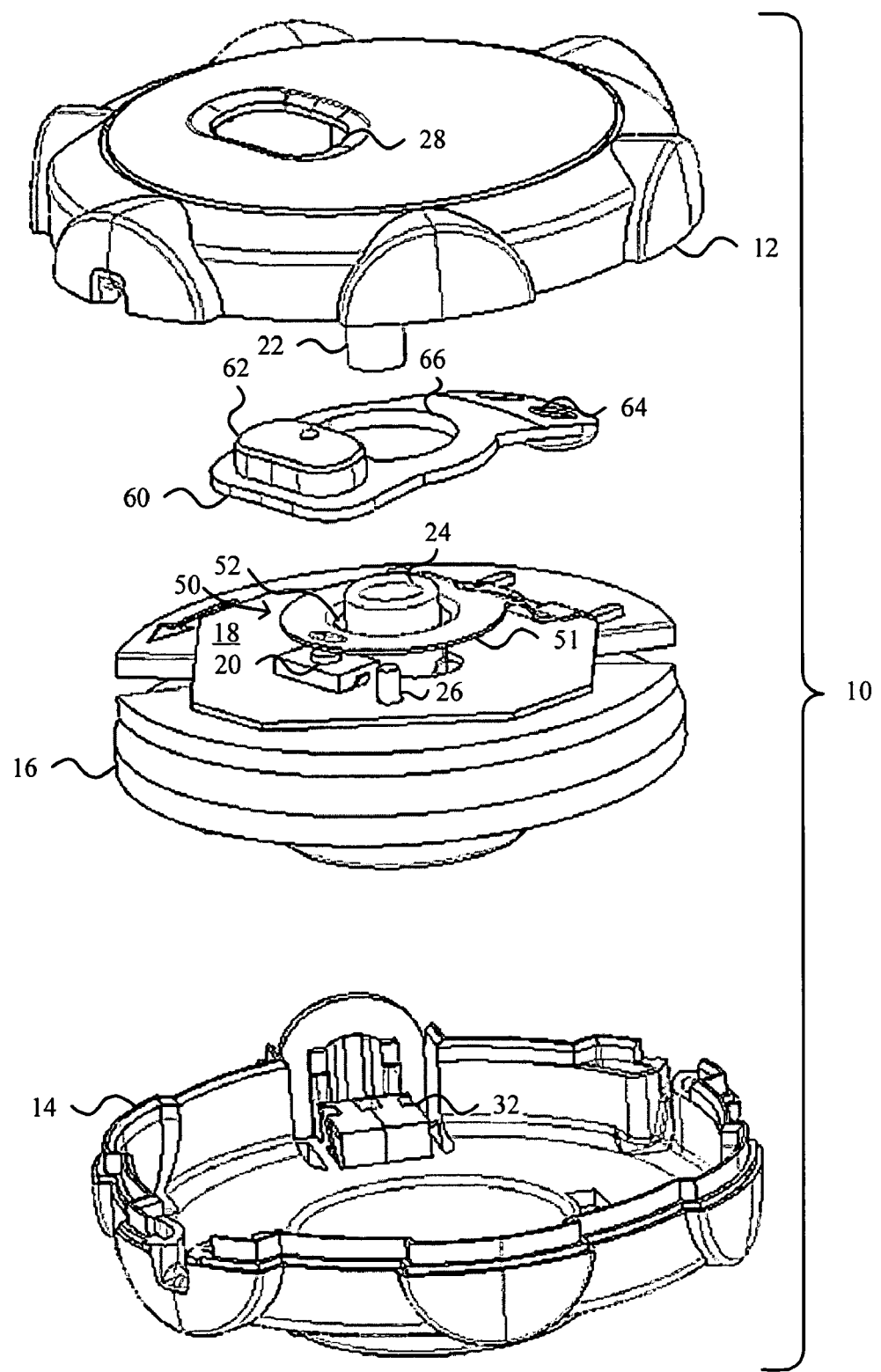
FIG. 1 is an exploded perspective view of a cable winding device having an electronic control interface directly on an exterior housing.

FIG. 1 is an exploded perspective view of a cable winding device 10 that provides an electronic control interface directly on an upper exterior housing 12 to control a rotating electronic control disposed within the cable winding device 10. As shown, the cable winding device 10 generally includes an upper and a lower exterior housing 12, 14 for housing a spool 16 onto which a cable (not shown) can be wound. The spool 16 can be supported by a spindle 22 extending from the housing through an axial opening 24 of the spool 16 such that the spool 16 rotates about the spindle 22. The housing 12, 14 also houses a circuit component such as a printed circuit board assembly (PCBA) 18, an electronic control actuator such as a keycap 60, and a rotational actuator interface such as a keycap skid pad 50. The PCBA 18 and rotational actuator interface 50 rotate with the spool such as by attaching each directly or indirectly to the spool 16. An electronic control 20 is provided on the PCBA 18 such that the electronic control 20 also rotates with the spool 16. The keycap 60 can be coupled and attached to the upper housing 12 such that the keycap 60 remains stationary relative to the housing 12, 14.

In the example shown, the keycap skid pad 50 can be coupled to the PCBA 18 for interfacing between the keycap 60 and the electronic control 20. As the skid pad 50 is coupled to the PCBA 18 which is in turn coupled to the spool 16, the skid pad 50 rotates with the spool 16 and thus rotates relative to the housing 12, 14 and the keycap 60. The electronic control 20 may be a momentary tact switch, for example, that is actuated or activated when depressed and is deactivated when depressed again. After each time the switch 20 is depressed for activation or deactivation, the switch generally returns to its original raised position when released. As will be described in more detail below, the skid pad 50 facilitates in allowing the switch 20 to be actuated using the keycap 60 regardless of the angular orientation of the keycap 60 relative to the switch 20 and regardless of whether the spool 16 is stationary or rotating when the switch 20 is actuated.

As noted, the PCBA 18 is secured to the spool 16, e.g., via heat staking, such that the PCBA 18 rotates with the spool 16. The keycap 60 can be attached to an interior surface of the upper exterior housing 12 at a mounting interface 64 which creates a cantilevered button by using, for example, heat staking, adhesives, mechanical hinges or fasteners, etc. The keycap 60 may provide an axial spindle opening 66 through which the spindle 22 may extend. In addition, the keycap 60 may provide an electronic control interface 62 such as a button or pad that serves as the user interface to actuate or otherwise control the electronic control 20 provided on the PCBA 18. The actuator pad 62 may extend at least partially through an actuator opening 28 provided in the upper housing 12 (as shown) or may otherwise be exposed and accessible through the housing 12.

When a user depresses the actuator pad 62, the cantilevered keycap 60 is deflected toward and pressed against the skid pad 50, forcing the skid pad 50 toward the switch 20 and thus actuating the switch 20. As will be described in more detail below with reference to FIG. 6, the keycap 60 may include a skid pad interface 68 such as a raised contact member to facilitate actuating the switch 20. Attaching the keycap 60 to the upper housing 12 at the mounting interface 64 and providing the axial spindle opening 66 allow the actuator pad 62 to move toward the skid pad 50 when depressed regardless of the rotational orientation of the actuator pad 62 relative to the skid pad 50 and may also facilitate in returning the actuator pad 62 to its original, un-actuated position when released.

Figure 2:
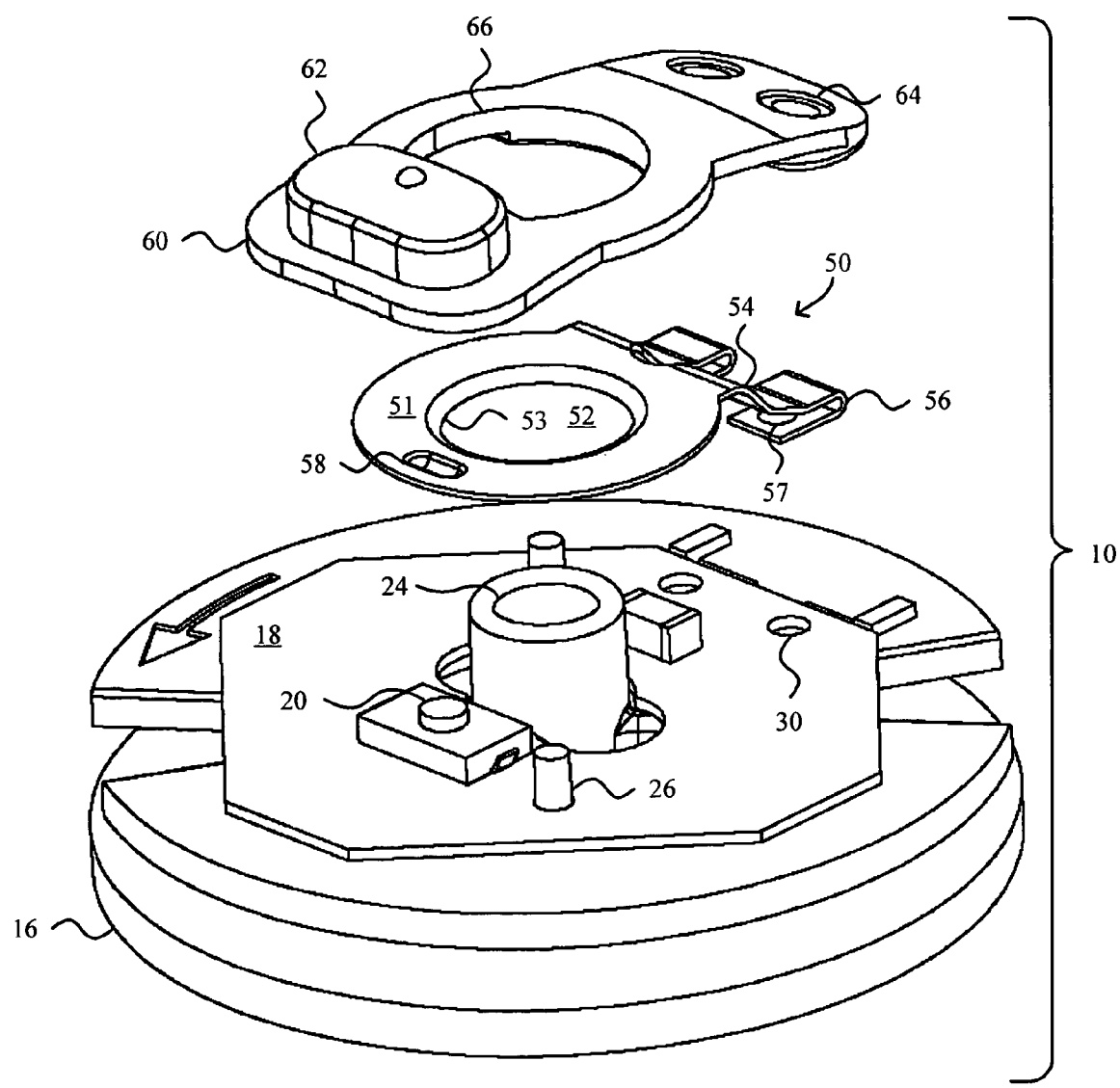
FIG. 2 is an exploded perspective view of the cable winding device of FIG. 1 illustrating the skid pad in more detail and shown without the exterior housing for purposes of clarity.
Figure 3:
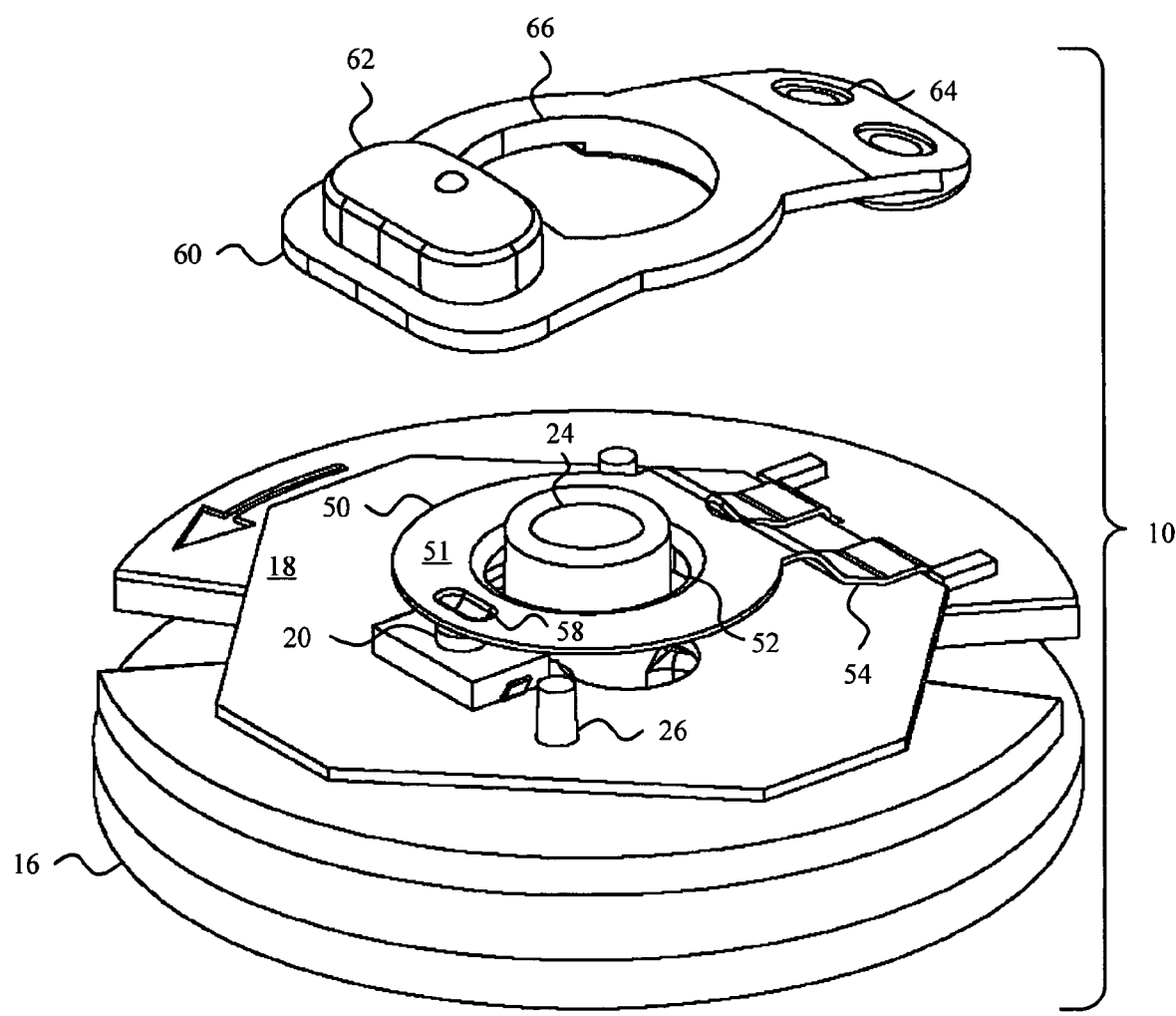
FIG. 3 is an exploded perspective view of the cable winding device of FIG. 1 illustrating the skid pad attached to the printed circuit board assembly (PCBA) in more detail.
Figure 4:
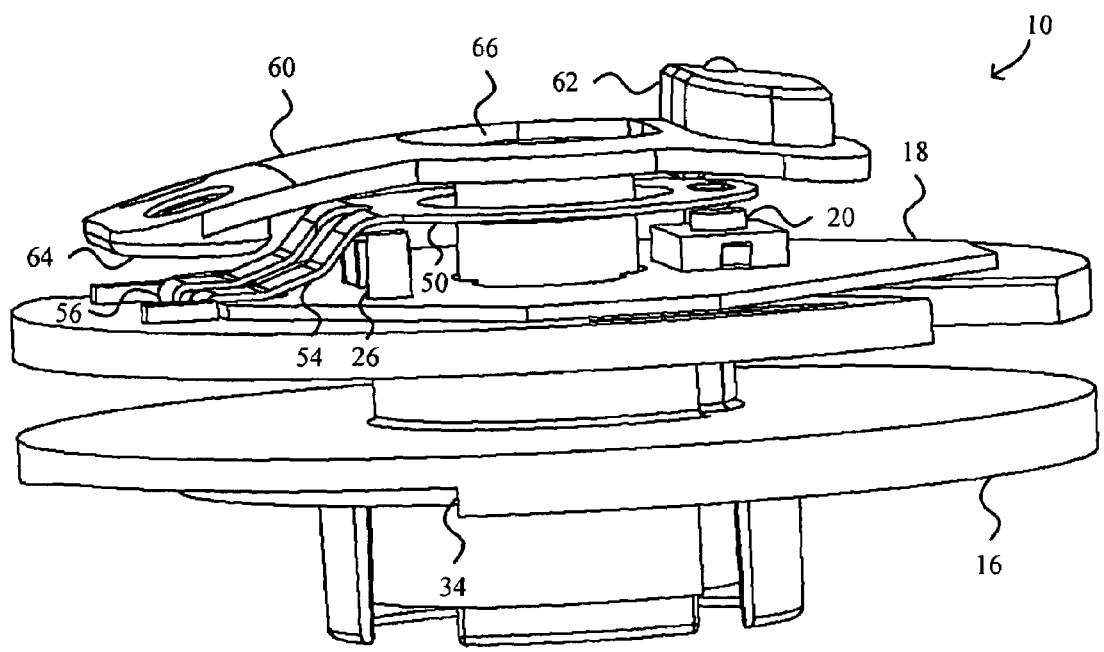
FIG. 4 is a side view of the cable winding device of FIG. 1 shown without the exterior housing for purposes of clarity.
Figure 5:
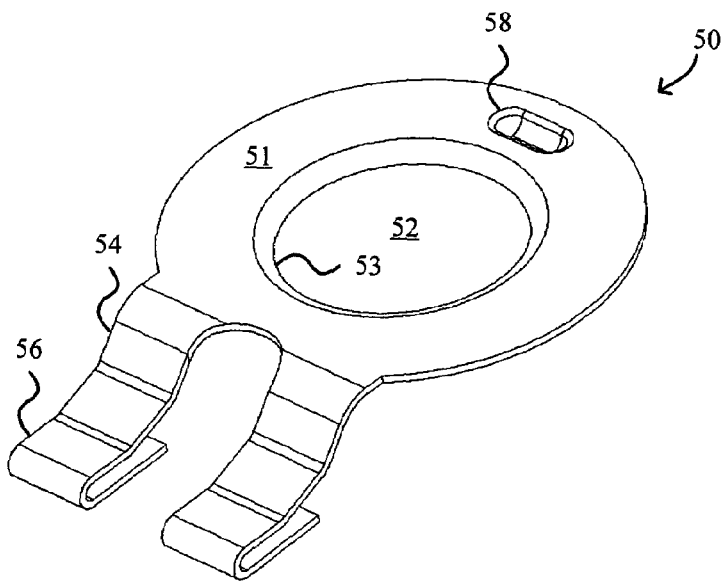
FIG. 5 illustrates an example of the skid pad of the cable winding device of FIG. 1 in more detail.

FIGS. 2–5 illustrate the various components and subassemblies of the cable winding device 10 in more detail. In particular, FIGS. 2 and 3 are exploded perspective views of the cable winding device 10 shown without the exterior housing to illustrate the skid pad 50 and its attachment to the PCBA 18 in more detail. FIG. 4 is a side view of the cable winding device 10 of FIG. 1 also shown without the exterior housing for purposes of clarity. FIG. 5 illustrates the skid pad 50 of the cable winding device 10 in more detail.

As shown, the electrical switch 20 is positioned off-center on the PCBA 18 from the axis of rotation of the spool 16, i.e., at a distance away from the axis of rotation of the spool 16. Thus as the spool 16 rotates about its axis of rotation, the switch 20 also rotates in unison in a circular pattern. The skid pad 50 facilitates in allowing the switch 20 to be actuated using the keycap 60 regardless of the angular orientation of the keycap 60 relative to the switch 20 and regardless of whether the spool 16 is stationary or rotating when the keycap 60 is depressed. In other words, the skid pad 50 facilitates in allowing the keycap 60 to be depressed and held depressed while the spool 16 is rotating in either direction, i.e., as the cable is wound onto or unwinding from the spool 16.

The skid pad 50 rotates with the spool 16 and the PCBA 18 such as by attaching the skid pad 50 to the PCBA 18. However, various other configurations may be employed to ensure that the skid pad 50 rotates with the spool 16. Merely as an example, the skid pad 50 may be directly attached to the spool 16.

In the example shown, the skid pad 50 generally includes an interfacing portion 51 for interfacing between the keycap 60 and the switch 20. The interfacing portion 51 may be generally circular or annular although various other shapes may be employed. In particular, the interfacing portion 51 defines an opening 52 through which the spindle 22 may extend. One or more legs 54 may extend from the annular interfacing portion 51 that terminate in feet 56 which facilitate in attaching the skid pad 50 to the PCBA 18 and/or spool 16. The legs 54 may be curved or otherwise sloped toward the PCBA 18 such that the interfacing portion 51 is generally cantilevered or otherwise suspended at one end over the PCBA 18 and thus over the switch 20. Thus the interfacing portion 51 generally only contacts and actuates the switch 20 when the skid pad 50 is forced down against the switch 20. The feet 56 are generally U-shaped and dimensioned similar to or slightly less than the thickness of the PCBA 18 so as to be securely attached thereto, e.g., via a frictional fit. To alternatively or additionally ensure that the skid pad 50 is securely attached to the PCBA 18, the feet 56 may define dimples 57 and the PCBA 18 may define corresponding openings 30 to receive the dimples 57. Various other configurations may be employed for securing the skid pad 50 to the PCBA 18.

The skid pad 50 may be formed from various suitable materials of sufficient rigidity or stiffness to support the cantilevered interfacing portion 51. For example, the skid pad 50 may be formed of a plastic or metal. For further stiffening or rigidity of the interfacing portion 51, the opening 52 may be formed by extrusion or punching such that the inner diameter of the interfacing portion 51 defines rounded flanges 53. To facilitate the actuation of the switch 20, the interfacing portion 51 may optionally be dimpled 58 at one or more locations such as directly over the switch 20. Thus, the skid pad 50 deflects toward the switch 20 when force is exerted on the skid pad 50 via the keycap 60 and the skid pad 50 returns approximately to its original cantilevered position upon release of the force via a return spring force action. In addition, the rigidity of the skid pad 50 preferably facilitates in allowing the keycap 60 to be depressed to actuate the switch 20 regardless of the angular orientation of the switch 20 relative to the keycap 60.

Figure 6:
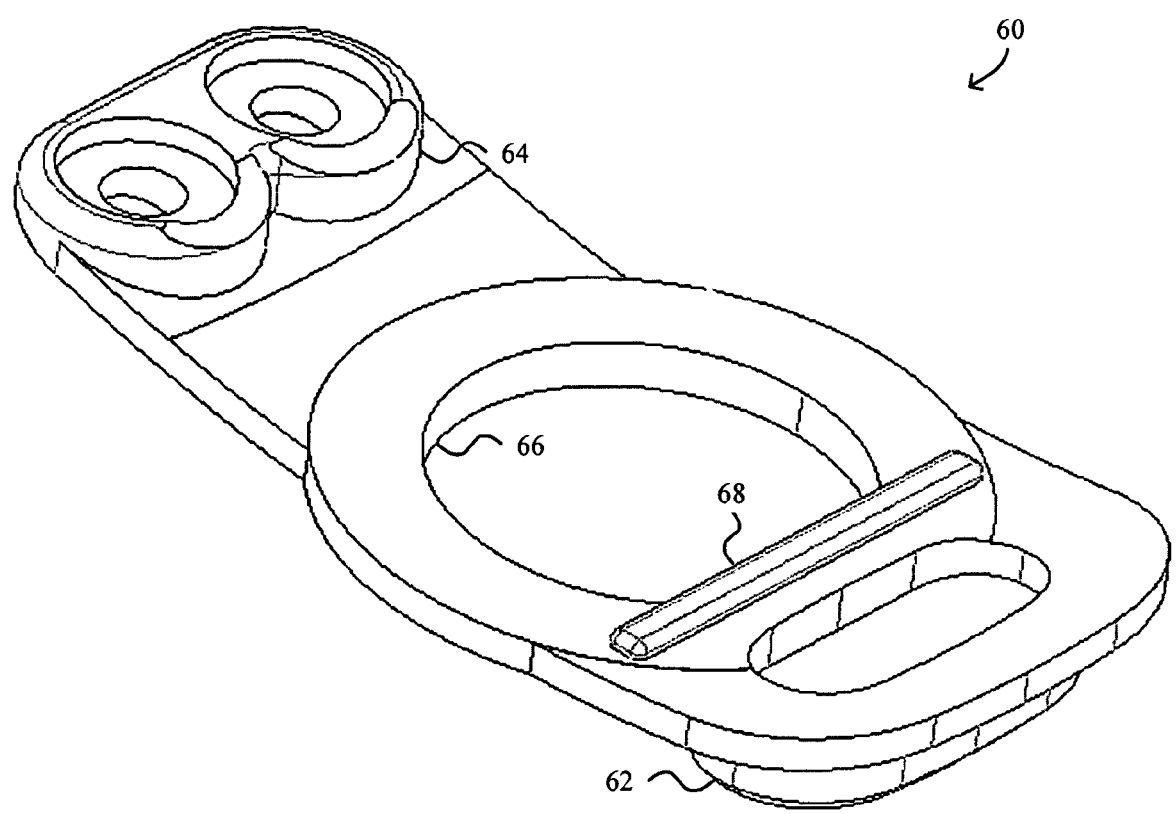
FIG. 6 illustrates an example of the keycap of the cable winding device of FIG. 1 in more detail.

FIG. 6 illustrates an example of the keycap 60 of the cable winding device 10 in more detail. As described above, the keycap 60 provides the actuator pad 62, the mounting interface 64, and the axial spindle opening 66. The keycap 60 may further provide a skid pad interface 68 on an interior surface thereof that makes contact with and forces the skid pad 50 toward the switch 20 when the actuator pad 62 of the keycap 60 is depressed. The skid pad interface 68 may be elongated, e.g., in the shape of an elongated bar or an elongated arc, for example, to maximize the area that interfaces with the skid pad 50 and thus facilitate the actuation of the switch 20 regardless of the any angular orientation of the keycap 60 relative to the switch 20. Thus, when the user depresses the actuator pad 62, the skid pad interface 68 is forced against and depresses the skid pad 50 toward the switch 20, thereby actuating the switch 20.

For added functionality and convenience, the spool 16 may be loaded with a power or torsional spring (not shown) to automatically rotate the spool 16 so as to wind the cable when the spool 16 is unconstrained. The power spring may be housed by the spool 16 and/or the lower housing 14, for example. Typically, the spool 16 rotates several revolutions to completely wind or unwind the cable. The spool wind-up can be constrained or limited by a ratchet pawl mechanism. For example, a ratchet pawl 32 may be provided on the lower housing 14 which acts on a ratchet 34 provided on a face of the flange of the spool 16. In one embodiment, the cable winding device 10 is configured to provide only one ratchet 34 such that the cable winding device 10 provides only one ratchet or click stop for each complete, i.e., 360°, revolution. With only one ratchet stop, the spool 16 thus returns to the same rotational or angular orientation at each ratchet stop. Preferably, the actuator pad 62 on the keycap 60 and switch 20 on the PCBA 18 are axially aligned with each other whenever the spool 16 is stopped. Such alignment facilitates in creating a more reliable and durable actuation interface.

The cable winding device 10 has no external rotating parts and maintains the actuator pad 62 on the keycap 60 stationary, i.e., at the same position regardless of the position of the switch 20 and regardless of whether the spool 16 is rotating or stationary. Thus, the cable winding device 10 provides convenience and ease of use to the user. The cable winding device 10 allows the user to activate a switch at anytime even while the cord winder is retracting or extruding cable. Furthermore, the switch 20, the skid pad 50 and the keycap 60 provides an approximately consistent load for a consistent force feedback at the actuator pad 62 to the user.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A cable winding apparatus, comprising:
   a housing;
   an electronic control actuator attached to the housing, the electronic control actuator providing an actuating pad that is one of actuatable through an opening defined in the housing and extending at least partially through the housing;
   a spool housed within the housing and rotatable relative thereto;
   a circuit component configured to rotate with the spool, the circuit component including an electronic control disposed thereon, the electronic control being actuatable via the actuating pad; and
   a rotational actuator interface configured to rotate with the spool, the rotational actuator interface being located over the electronic control and configured to interface between the actuator pad and the electronic control.

2. The cable winding apparatus of claim 1, wherein the spool rotates about an axis of rotation and the electronic control is located off of the axis of rotation.

3. The cable winding apparatus of claim 1, wherein the electronic control is selected from the group consisting of answer/end control, on/off control, mute control, volume control, play/stop control, rewind/fast forward control, and/or enter/accept control.

4. The cable winding apparatus of claim 1, wherein the rotational actuator interface is coupled to the circuit component or spool at one end and cantilevered over the electronic control at an opposing end.

5. The cable winding apparatus of claim 1, wherein the rotational actuator interface is a skid pad for the electronic control actuator, the electronic control actuator being configured to activate the electronic control by depressing the actuating pad, causing the rotational actuator interface to be forced toward and actuate the electronic control.

6. The cable winding apparatus of claim 1, wherein the electronic control actuator is configured to activate the electronic control by depressing the actuating pad, and wherein the rotational actuator interface facilitates the electronic control actuator in actuating the electronic control at all rotational orientations of the electronic control relative to the actuating pad.

7. The cable winding apparatus of claim 1, wherein the electronic control actuator provides at least one raised contact member disposed on a surface opposite that of the actuating pad to facilitate contact between the raised contact member and the rotational actuator interface when the actuating pad is actuated.

8. The cable winding apparatus of claim 1, wherein the electronic control actuator is configured to actuate the electronic control by a force depressing the actuating pad toward the rotational actuator interface, whereupon the rotational actuator interface is forced against the electronic control thereby actuating the electronic control.

9. The cable winding apparatus of claim 1, further comprising a ratchet pawl mechanism including a ratchet that rotates with the spool and a ratchet pawl provided on an interior of the housing to engage the ratchet, the ratchet pawl mechanism being configured with only one ratchet stop for each complete revolution of the spool.

10. The cable winding apparatus of claim 9, wherein the actuating pad and the electronic control are axially aligned when the ratchet and the ratchet pawl are engaged.

11. A headset system, comprising:
a headset including a speaker; and
a cable winding apparatus including:
    a housing;
    an electronic control actuator attached to the housing, the electronic control actuator providing an actuating pad that is one of actuatable through an opening defined in the housing and extending at least partially through the housing;
    a spool housed within the housing and rotatable relative thereto;
    a circuit component configured to rotate with the spool, the circuit component including an electronic control disposed thereon, the electronic control being actuatable via the actuating pad; and
    a rotational actuator interface configured to rotate with the spool, the rotational actuator interface being suspended over the electronic control and configured to interface between the actuator pad and the electronic control.

12. The headset system of claim 11, wherein the spool rotates about an axis of rotation and the electronic control is located off of the axis of rotation.

13. The headset system of claim 11, wherein the electronic control is selected from the group consisting of answer/end control, on/off control, mute control, volume control, play/stop control, rewind/fast forward control, and/or enter/accept control.

14. The headset system of claim 11, wherein the rotational actuator interface is coupled to the circuit component or spool at one end and cantilevered over the electronic control at an opposing end.

15. The headset system of claim 11, wherein the rotational actuator interface is a skid pad for the electronic control actuator, the electronic control actuator being configured to activate the electronic control by depressing the actuating pad, the rotational actuator interface being further configured to contact the electronic control actuator whenever the electronic actuating pad is depressed.

16. The headset system of claim 11, wherein the electronic control actuator is configured to activate the electronic control by depressing the actuating pad, and wherein the rotational actuator interface facilitates the electronic control actuator in actuating the electronic control at all rotational orientations of the electronic control relative to the actuating pad.

17. The headset system of claim 11, wherein the electronic control actuator provides at least one raised contact member disposed on a surface opposite that of the actuating pad to facilitate contact between the raised contact member and the rotational actuator interface when the actuating pad is actuated.

18. The headset system of claim 11, wherein the electronic control actuator is configured to actuate the electronic control by a force depressing the actuating pad toward the rotational actuator interface, whereupon the rotational actuator interface is forced against the electronic control thereby actuating the electronic control.

19. The headset system of claim 11, further comprising a ratchet pawl mechanism including a ratchet that rotates with the spool and a ratchet pawl provided on an interior of the housing to engage the ratchet, the ratchet pawl mechanism being configured with only one ratchet stop for each complete revolution of the spool.

20. The headset system of claim 19, wherein the actuating pad and the electronic control are axially aligned when the ratchet and the ratchet pawl are engaged.

* * * * *